United States Patent [19]
Goodman

[11] Patent Number: 5,695,140
[45] Date of Patent: Dec. 9, 1997

[54] FISHING REEL

[76] Inventor: Howard Goodman, 11732 Pine Tree Dr., Fairfax, Va. 22033

[21] Appl. No.: 695,376

[22] Filed: Aug. 9, 1996

Related U.S. Application Data

[63] Continuation of Ser. No. 311,051, Sep. 23, 1994, abandoned.

[51] Int. Cl.$^6$ ............................................. A01K 89/017
[52] U.S. Cl. ........................ 242/250; 242/310; 242/322; 242/613.1; 242/614
[58] Field of Search ........................ 242/250, 310, 242/390.8, 303, 376, 407, 613.1, 614, 118.4, 322

[56] References Cited

U.S. PATENT DOCUMENTS

| | | | |
|---|---|---|---|
| 2,630,279 | 3/1953 | Wilson | 242/322 X |
| 3,561,695 | 2/1971 | Wood, Jr. | 242/250 |
| 3,735,934 | 5/1973 | Black | 242/390.8 |
| 3,835,571 | 9/1974 | Berry | 242/250 X |
| 3,910,524 | 10/1975 | Ireland | 242/250 X |
| 4,021,003 | 5/1977 | Watkins | 242/250 |
| 4,274,219 | 6/1981 | Way | 242/250 X |
| 4,283,025 | 8/1981 | Whisenhunt | 242/250 |
| 4,344,587 | 8/1982 | Hildreth | 242/250 X |
| 4,378,652 | 4/1983 | Lindgren | 242/250 X |
| 4,418,877 | 12/1983 | Nakajima | 242/322 X |
| 4,664,330 | 5/1987 | Darden | 242/303 X |
| 5,190,237 | 3/1993 | Fagan | 242/390.8 |
| 5,265,822 | 11/1993 | Shober, Jr. et al. | 242/407 X |
| 5,400,979 | 3/1995 | Goodman | 242/225 |

*Primary Examiner*—Daniel P. Stodola
*Assistant Examiner*—William A. Rivera
*Attorney, Agent, or Firm*—Rossi & Associates

[57] ABSTRACT

A fishing reel of simple mechanical design includes an electrical drive motor, a drive shaft coupled to the electrical drive motor, and a cylindrical reel member mounted on the drive shaft. The cylindrical reel member includes a circumferential slot cut into the reel member at an angle to a centerline of the reel. An outer housing is also preferably provided to enclose the cylindrical reel member.

1 Claim, 2 Drawing Sheets

FISHING REEL

This is a continuation of application Ser. No. 08/311,051 filed Sep. 23, 1994, now abandoned.

FIELD OF THE INVENTION

The invention relates in general to to fishing reels. More specifically, the invention relates to fishing reel of simplified mechanical design that minimizes the number of parts required for its manufacture.

BACKGROUND OF THE INVENTION

There are many different types of fishing reels currently available and a number of attempts have been made to improve the operation of the fishing reels by a variety of mechanisms. Conventional fishing reels, however, have become more and more complex in their mechanical design, thereby increasing the expense of the reels. The present invention is directed to providing a fishing reel of simple design that can be easily manufactured.

SUMMARY OF THE INVENTION

The invention provides a fishing reel of simple mechanical design that includes an electrical drive motor, a drive shaft coupled to the electrical drive motor, and a cylindrical reel member mounted on the drive shaft. The cylindrical reel member includes a circumferential slot cut into the reel member at an angle to a centerline of the reel. An outer housing is also preferably provided to enclose the cylindrical reel member.

BRIEF DESCRIPTION OF THE DRAWINGS

The invention will be described in greater detail with reference to the drawings, wherein.

DETAILED DESCRIPTION OF THE INVENTION

Figure 1:
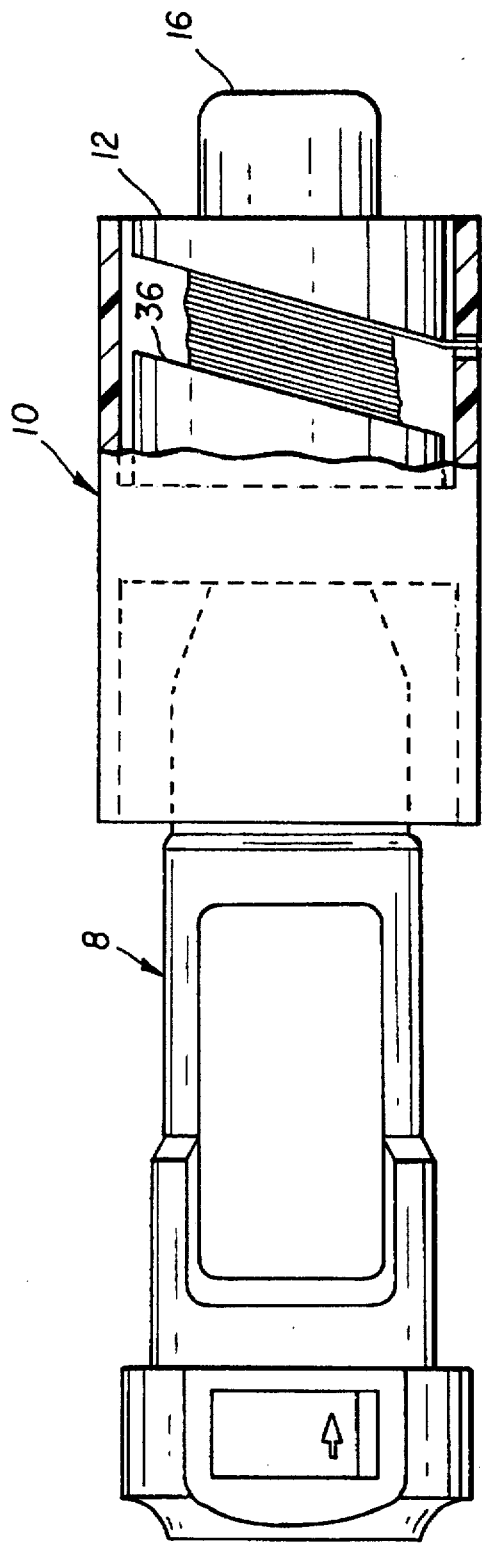
FIG. 1 is a partial sectional view of a fishing reel according to the invention.
Figure 2:
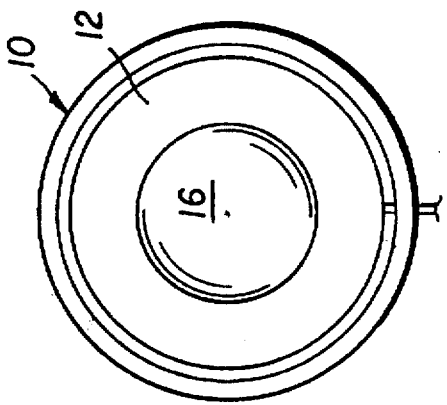
FIG. 2 is a front view of the fishing reel shown in FIG. 1.
Figure 3:
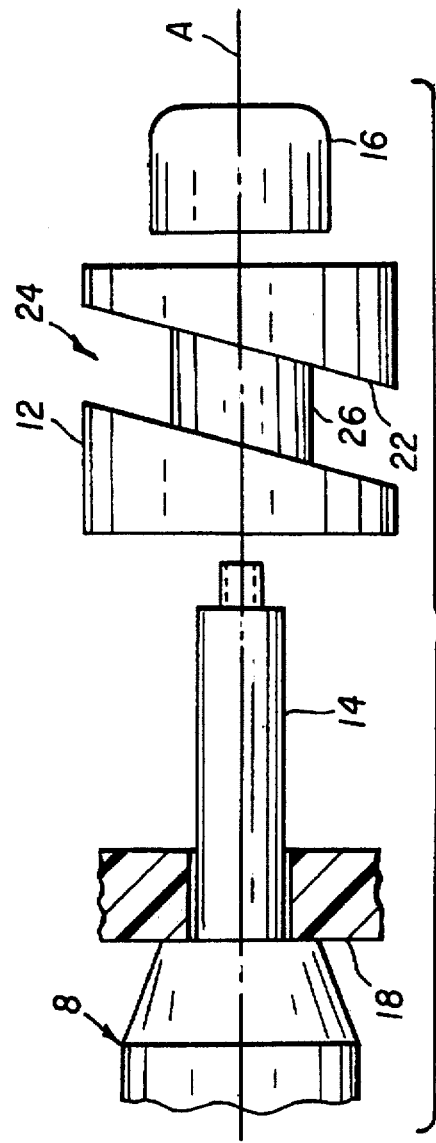
FIG. 3 is a partial exploded view of the fishing reel illustrated in FIG. 1.

A fishing reel in accordance with the invention is illustrated in FIGS. 1-3. The fishing reel preferably includes a cylindrical outer housing 10, a cylindrical slotted reel 12, and a drive shaft 14. The drive shaft 14 is preferably threaded on both ends to permit the attachment of an electric motor 8 and a reel retaining tension nut 16. The electric motor 8 is preferably a variable speed motor that can be operated in a forward and reverse direction. A DC electric screw driver with a threaded bit, for example, can be used for the electric motor 8.

The fishing reel is assembled by screwing the drive shaft 14 onto the electric motor 8, sliding the outer housing 10 onto the drive shaft 14 until a surface wall 18 is located against the motor 8, sliding the slotted reel 12 onto the drive shaft, and screwing the reel retaining tension nut 16 onto the drive shaft 14. It should be noted that, although the illustrated embodiment utilizes a separate outer housing 10 and electric motor 8, the outer housing 10 and electric motor 8 can be readily formed as one integral unit, i.e., the outer housing 10 may comprise the housing of the electric motor 8. In the illustrated embodiment, the outer housing 10 is coupled to the electric motor via a fastening mechanism such as screws (not shown). If desired, the drive shaft 14 may also be rotatably coupled to the outer housing 10 by a bearing assembly, so that the combined outer housing 10 and drive shaft 14 form an integral unit.

Figure 4:
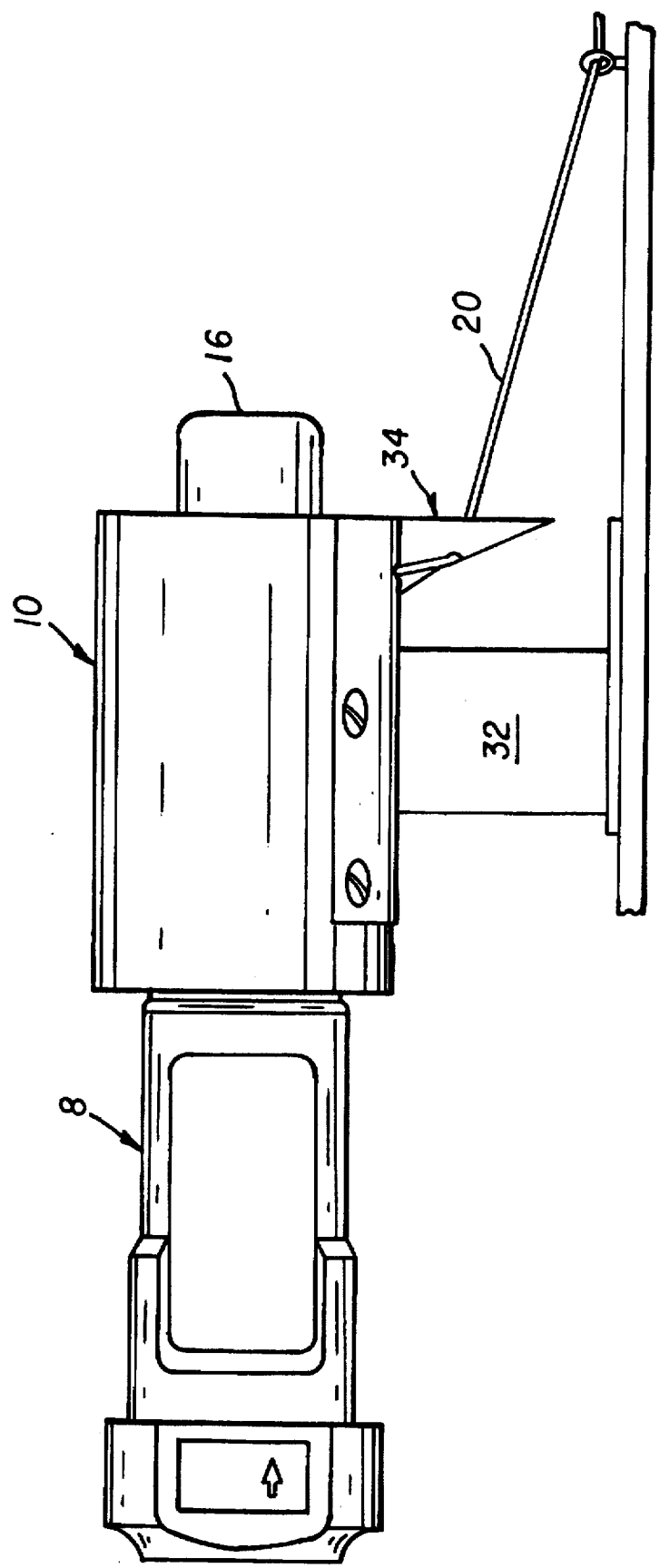
FIG. 4 is a side view of the fishing reel illustrated in FIG. 1.

The reel 12 includes a circumferential slot 24 that is cut at an angle to a centerline (A) of the reel 12 to form an inner core 26. A fishing line 20 is threaded through a hole 28 provided in the outer housing 10 and around the inner core 26. The fishing line 20 is wound and unwound be activating the electric motor 8 to rotate the reel 12. A front surface 22 and rear surface 30 of the circumferential slot 24 prevent the fishing line 20 from slipping out of the circumferential slot 24 as the reel 12 rotates. The fishing reel is attached to a pole 36 by a mounting bracket 32 as shown in FIG. 4. The mounting bracket 32 preferably includes a guide member 34 through which the fishing line 20 is threaded as it exits hole 28 (see FIG. 1).

The simple construction and minimal number of components of the fishing reel insures that the reel can be manufactured at a minimal cost. The major components of the reel, including the outer housing 10 and reel 12 can be readily formed by injection molding. Although the drive shaft 14 is preferably metal, it can also be manufactured by injection molding if so desired.

The invention has been described with reference to certain preferred embodiments thereof. It will be understood, however, that modifications and variations are possible within the scope of the appended claims.

What is claimed is:

1. A fishing reel comprising: an outer housing; an electrical drive motor; a drive shaft coupled to the electrical drive motor and extending into the outer housing; a cylindrical reel member mounted on the drive shaft and located within the outer housing; and means for mounting the outer housing to a fishing rod;

wherein the cylindrical reel member includes a circumferential slot cut into the reel member at an oblique angle to a centerline of the reel member and an inner core defining the inner boundary of the circumferential slot, the inner core disposed concentrically with respect to the centerline of the reel member;

wherein the circumferential slot includes a front surface and a back surface that are located in parallel planes that pass through the centerline of the reel member at the oblique angle;

wherein a fishing line is wound and unwound on the inner core as the reel member is selectively rotated in first and second directions when the drive shaft is driven by the electrical drive motor; and wherein the from surface and the back surface of the circumferential slot prevent the fishing line from slipping out of the circumferential slot as the reel member is rotated.

* * * * *